United States Patent [19]

Takeuchi et al.

[11] Patent Number: 4,841,869
[45] Date of Patent: Jun. 27, 1989

[54] CONVEYOR SYSTEM UTILIZING LINEAR MOTOR

[75] Inventors: Toshiyuki Takeuchi; Masayuki Tsuneta, both of Komaki, Japan

[73] Assignee: Daifuki, Co., Ltd., Osaka, Japan

[21] Appl. No.: 283,269

[22] Filed: Dec. 9, 1988

Related U.S. Application Data

[63] Continuation of Ser. No. 7,117, Jan. 27, 1987, abandoned.

[30] Foreign Application Priority Data

Jan. 27, 1986 [JP] Japan .................................. 61-14928
Nov. 29, 1986 [JP] Japan ................................ 62-285162

[51] Int. Cl.⁴ ............................................ G05B 11/00
[52] U.S. Cl. .................................... 104/292; 104/140; 104/290
[58] Field of Search .................. 104/88, 140, 247, 290, 104/292, 295; 105/3, 4.1; 318/38, 135, 687

[56] References Cited

U.S. PATENT DOCUMENTS

| | | | |
|---|---|---|---|
| 396,792 | 1/1889 | Williams | 104/292 |
| 4,197,933 | 4/1980 | Dunstan et al. | 104/290 |
| 4,613,805 | 9/1986 | Matsuo et al. | 104/292 |
| 4,649,830 | 3/1987 | Tanaka | 104/140 |
| 4,669,047 | 5/1987 | Chucta | 104/88 |

Primary Examiner—Joseph F. Peters, Jr.
Assistant Examiner—Edwin L. Swinehart
Attorney, Agent, or Firm—Webb, Burden, Ziesenheim & Webb

[57] ABSTRACT

A conveyor system utilizing the linear motor, comprising a conveyor cart and a guide rail for movably supporting the conveyor cart. The guide rail includes primary coils, and the conveyor cart includes a flexible secondary conductor extending longitudinally of the cart so as to follow the guide rail. The primary coils comprise a station primary coil disposed at each loading and unloading station for stopping and starting the conveyor cart, two primary coils adjacent opposite ends of the station primary coil for decelerating the conveyor cart that is to be stopped at the station by the station primary coil and for accelerating the conveyor cart having started from the station to a target running speed, and a plurality of intermediate accelerating primary coils disposed between two adjacent stations for accelerating the conveyor cart to maintain the latter at the target running speed.

13 Claims, 19 Drawing Sheets

(A)

(B)

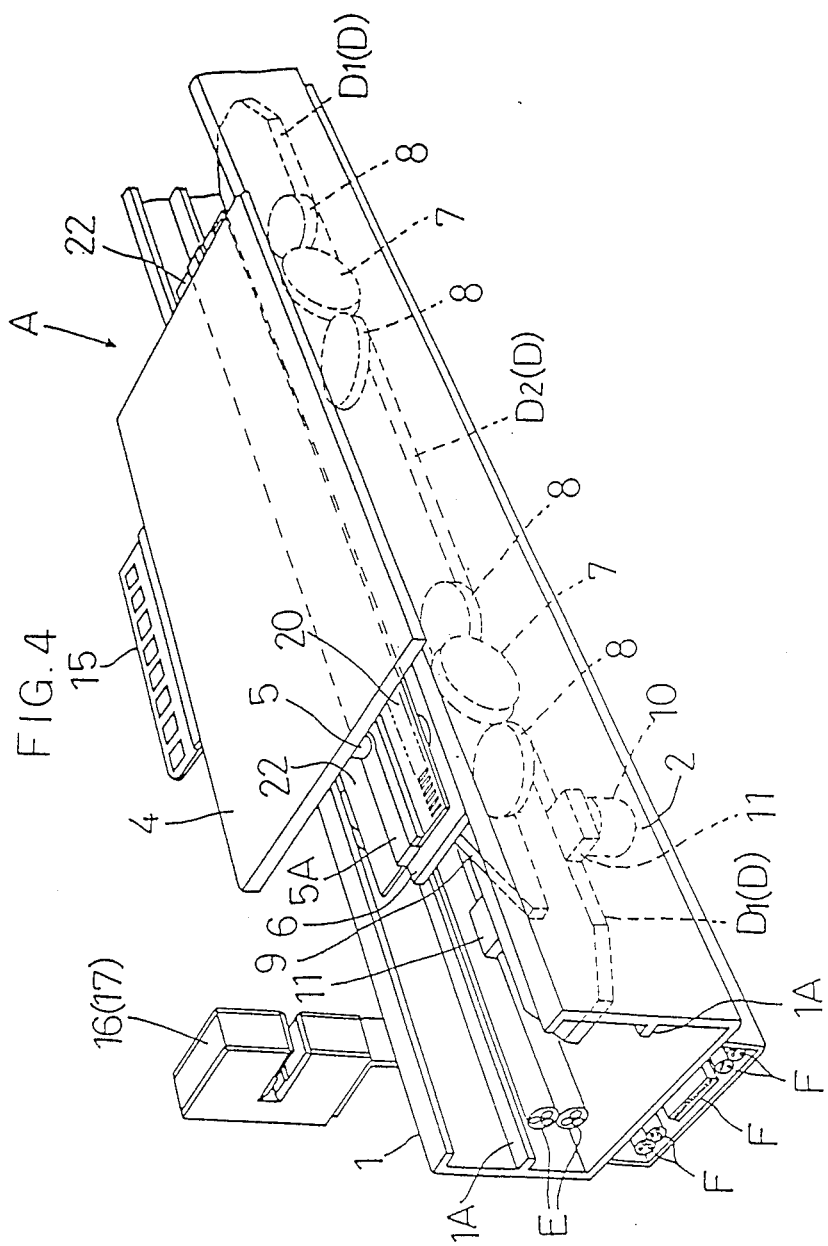

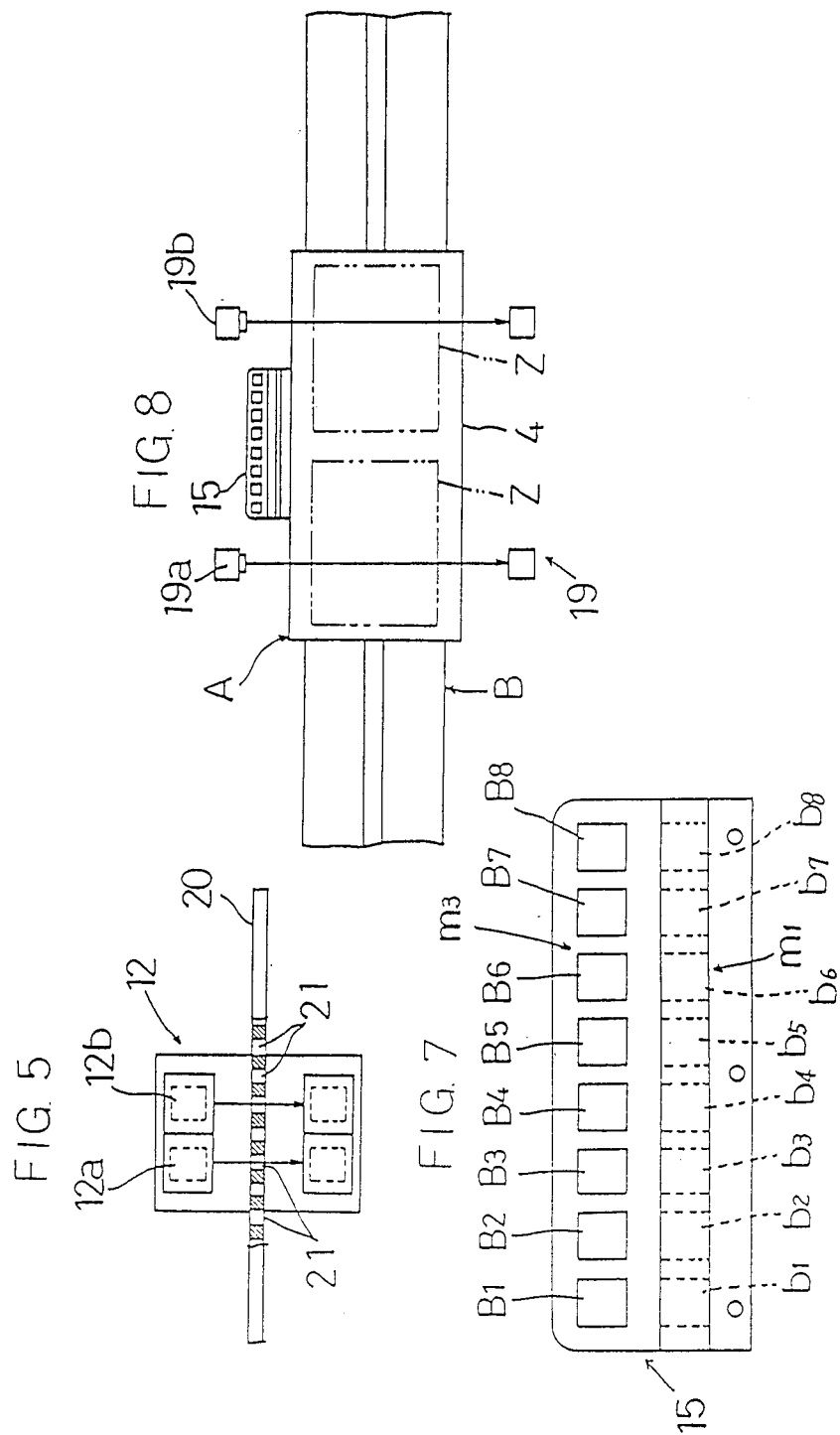

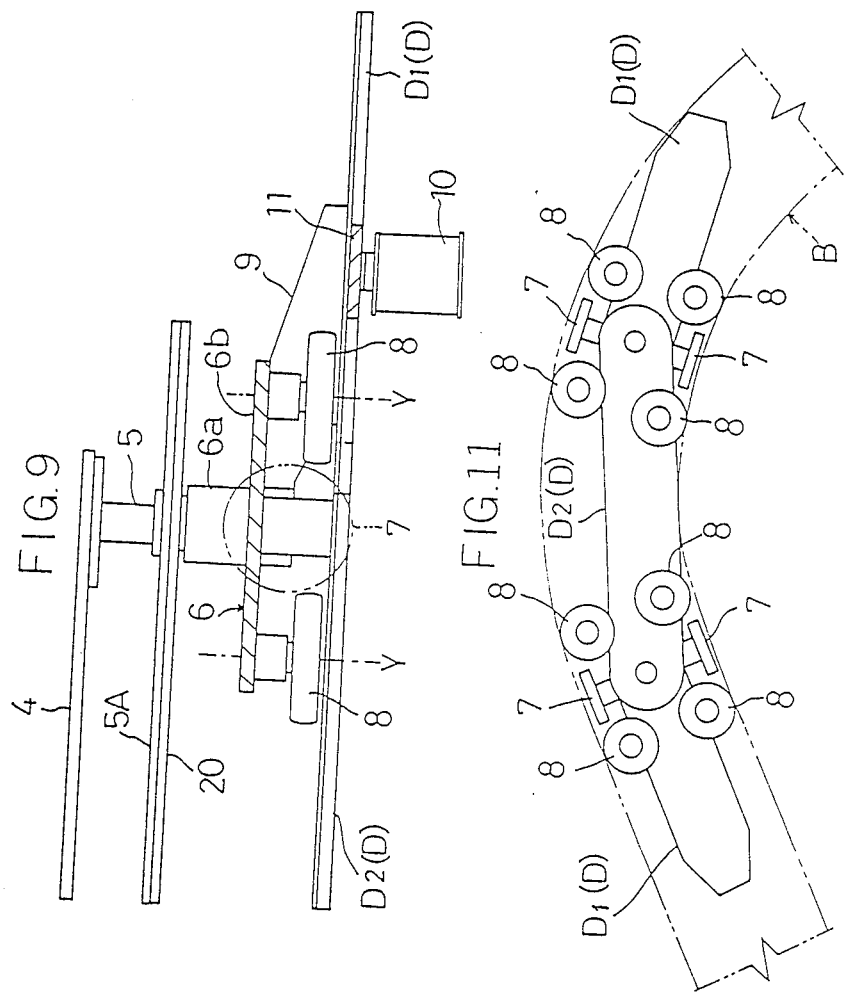

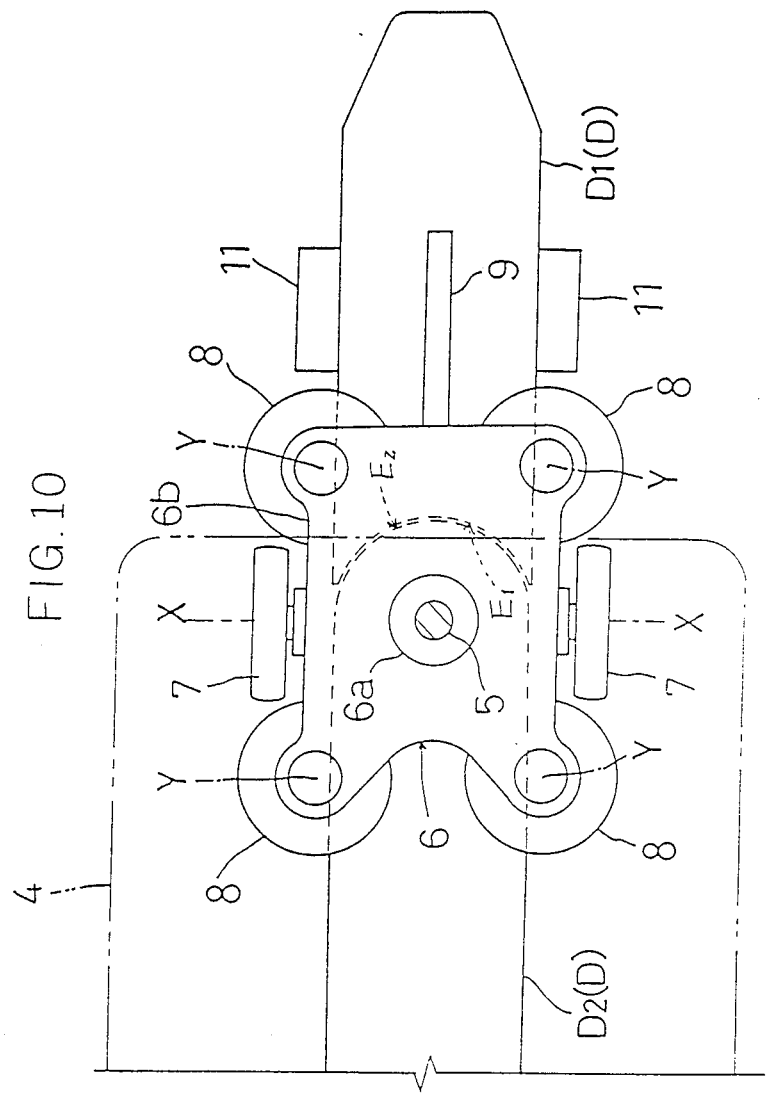

FIG·16

CONVEYOR SYSTEM UTILIZING LINEAR MOTOR

This application is a continuation of application Ser. No. 07/007,117, filed Jan. 27, 1987, now abandoned.

BACKGROUND OF THE INVENTION

The present invention relates to a conveyor system utilizing the linear motor for driving conveyor carts, and more particularly to a conveyor system comprising a conveyor cart, a guide rail for movably supporting the conveyor cart, primary coils mounted on the guide rail and a secondary conductor mounted on the conveyor cart.

Conventionally the secondary conductor mounted on the conveyor cart is formed of a single plate. There are a case where the linear motor comprises a secondary conductor mounted horizontally on the conveyor cart and a case where the linear motor comprises a secondary conductor mounted vertically on the conveyor cart. The former is suited for use with a running track including horizontal curves, while the latter is suited for use with a running track including vertical curves.

Furthermore, the primary coils are arranged at appropriate intervals longitudinally of the guide rail in some cases, and in continuous series longitudinally of the guide rail in other cases. In the former case it is desirable that the primary coils have a good length in order to prolong a period of acceleration or deceleration effected by the intermittently arranged primary coils. In the latter case too it is desirable that the primary coils have a good length in order to provide a strong propulsive force.

In addition, such an article conveyor system that drives the conveyor carts to stations disposed at various locations has the guide rail curved in horizontal and vertical directions to define horizontally curved and vertically curved running track portions. It is desirable for such curved track portions to have the smallest possible radius of curvature in order to achieve high conveying efficiency.

However, the conventional construction including the secondary conductor formed of a single plate having a large length has the disadvantage that the radius of curvature at the curved running track portions cannot be reduced to a satisfactory degree. Where, for example, the secondary conductor is placed to move through an interior space of the guide rail, it is necessary to avoid a collision between the secondary conductor and the guide rail. Where the conveyor cart is driven by the linear motor also at the curved track portions, it is necessary to maintain the entire secondary conductor in a proper position relative to the primary coils.

SUMMARY OF THE INVENTION

The present invention has been made having regard to the state of the art noted above, and its object is to provide means to reduce the radius of curvature at curved running track portions to a satisfactory degree while permitting the secondary conductor to have a considerable length.

In order to achieve this object a conveyor system utilizing the linear motor according to the present invention comprises a conveyor cart, a guide rail for movably supporting the conveyor cart, primary coil means mounted on the guide rail, a flexible secondary conductor mounted on the conveyor cart, the secondary conductor being divided into a plurality of conductor parts arranged longitudinally of the conveyor cart, and rollers attached to the conveyor cart and guided by the guide rail, whereby the plurality of conductor parts are flexible by the rollers to extend along and follow the guide rail.

Thus, according to the present invention, the secondary conductor is divided into a plurality of conductor parts which are maintained in a position extending longitudinally of the guide rail by means of rollers guided by the guide rail. The conductor parts assume a linear posture in a straight running track portion, and are flexed in a curved track portion.

Therefore, the secondary conductor is free from a collision with the guide rail even where the secondary conductor has a great length and the curved running track portions have a very small radius of curvature. Also, the conveyor cart is properly driven by the linear motor by utilizing the entire secondary conductor at the curved running track portions. The conveyor system according to the present invention permits the secondary conductor to have a sufficient length for excellent drive performance, and the curved running track portions to have a very small radius of curvature to achieves a high efficiency of conveyance.

Other objects and advantages of the present invention will be apparent from the following description.

BRIEF DESCRIPTION OF THE DRAWINGS

The drawings illustrate a conveyor system utilizing the linear motor according to the present invention, in which:

FIG. 4 is a schematic perspective view of the conveyor cart, FIG. 5 is a schematic side view of a two-phase sensor, FIG. 6 is a schematic plan view of a slit plate and detection piece mounting structure, FIG. 7 is a schematic plan view of a data memory plate, FIG. 8 is a schematic plan view of a load detecting sensor, FIG. 9 is a side view of a part of the conveyor cart, FIG. 10 is a plan view of the part of the conveyor cart, FIG. 11 is a schematic plan view of the conveyor cart in a flexed state.

DESCRIPTION OF THE PREFERRED EMBODIMENTS

An embodiment of the present invention will be described hereinafter with reference to the drawings.

Figure 1:
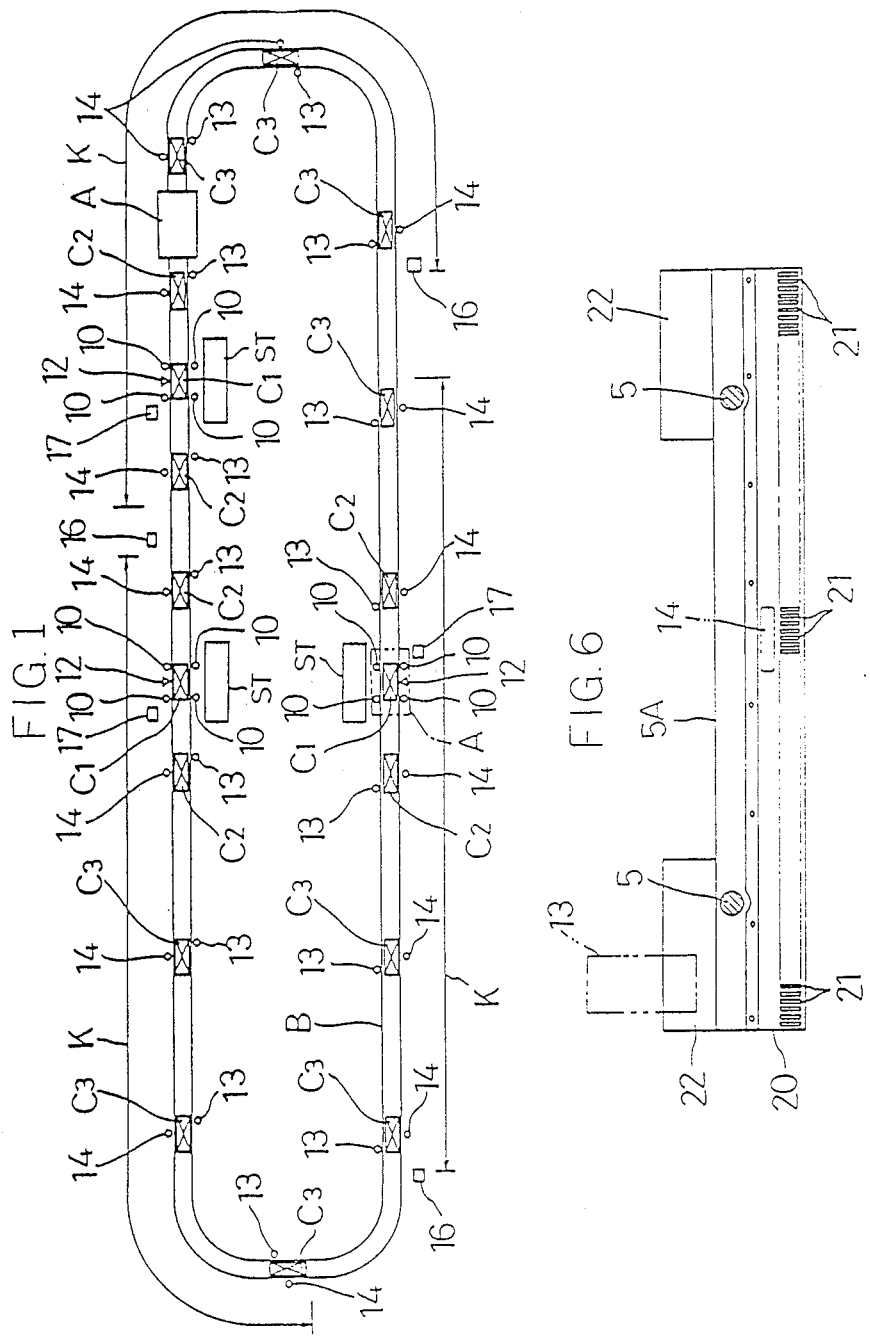
FIG. 1 is a schematic plan view of the conveyor system.

FIG. 1 shows, by way of example, a conveyor system utilizing the linear motor. The system comprises a conveyor cart A for carrying articles, and a guide rail B in loop form for guiding the conveyor cart A to run via stations ST where the articles are loaded and unloaded. The conveyor cart A is driven by the linear motor to convey various types of article as described later.

In describing this embodiment it is assumed that the conveyor cart A is driven only counterclockwise along the guide rail B. In practice, however, it often is the case that the conveyor cart A is driven clockwise as well as counterclockwise, and therefore the description to follow also includes the case where the conveyor cart A is driven both clockwise and counterclockwise, or back and forth.

Figure 3:
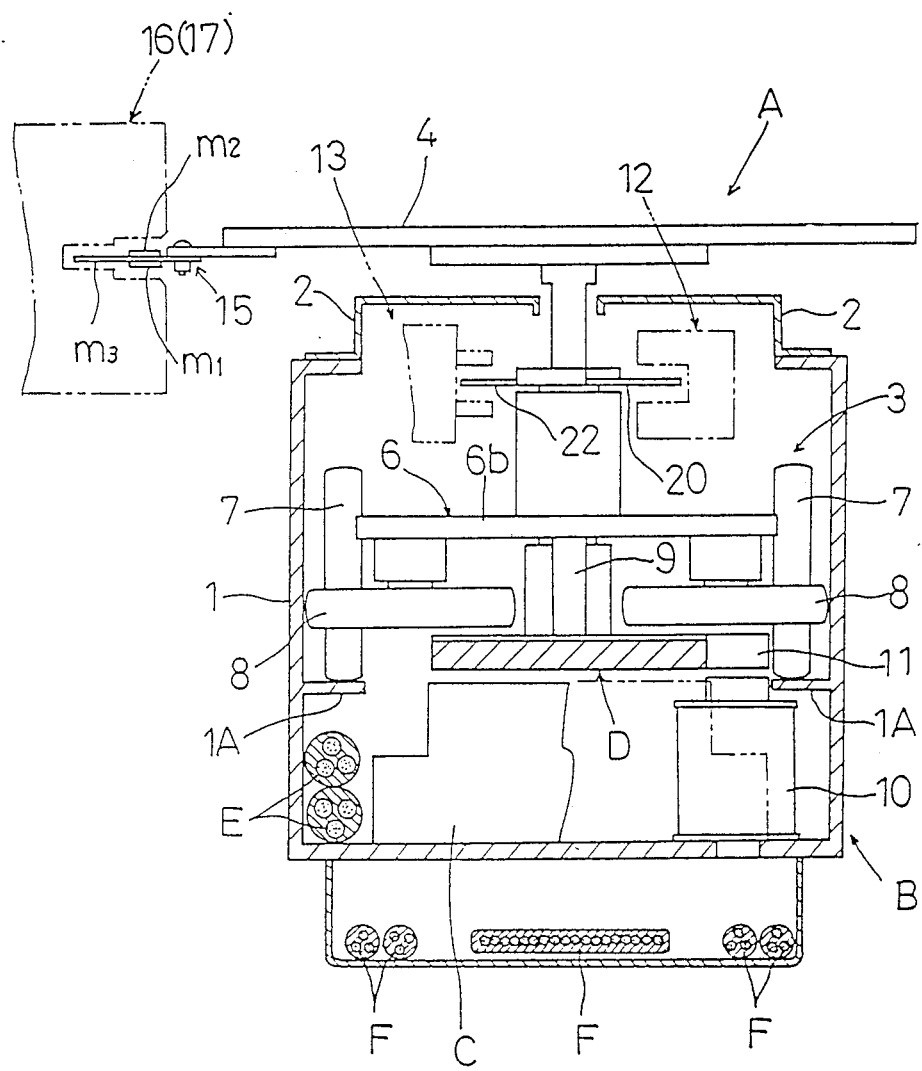
FIG. 3 is a front view of a conveyor cart.

As shown in FIG. 3, the guide rail B has a tubular configuration including a main frame 1 having a U-shaped cross section and a pair of right and left covers 2 attached to top edges of the main frame 1. The guide rail B contains a drive section 3 of the conveyor cart A in an upper portion thereof, and primary coils C in a lower portion thereof. The primary coils C are arranged at intervals along the traveling direction of the conveyor cart A.

To be particular, the main frame 1 includes rail members 1A formed at vertically intermediate positions of and integral with right and left lateral walls thereof, respectively, for supporting the drive section 3 of the cart, and the primary coils C mounted on a bottom wall of the main frame 1.

As seen from FIG. 1, the primary coils C comprise a station primary coil C1 disposed opposite each station ST, accelerating and decelerating primary coils C2 disposed at opposite sides of and close to the primary coil C1, and intermediate accelerating primary coils C3 disposed between two adjacent stations ST. The station primary coil C1 is used to decelerate and stop the conveyor cart A at the station ST and to start and accelerate the conveyor cart A to leave the station ST. The accelerating and decelerating primary coils C2 are used to decelerate the conveyor cart A that is to be stopped at the station ST to a target speed, to accelerate the conveyor cart A that is to be driven past the station ST to a target speed, and to accelerate the conveyor cart A that has started from the station ST to the target speed. The intermediate accelerating primary coils C3 are used to accelerate the conveyor cart A to the target speed.

In the course of describing this embodiment the primary coils C1, C2 and C3 are collectively called primary coils C as necessary.

In FIG. 3, reference E denotes power lines extending laterally along the primary coils C and shut off by the guide rail B with respect to signal lines F extending under the guide rail B. In other words, the guide rail B is utilized to guard the signal lines F against noise.

Figure 18:
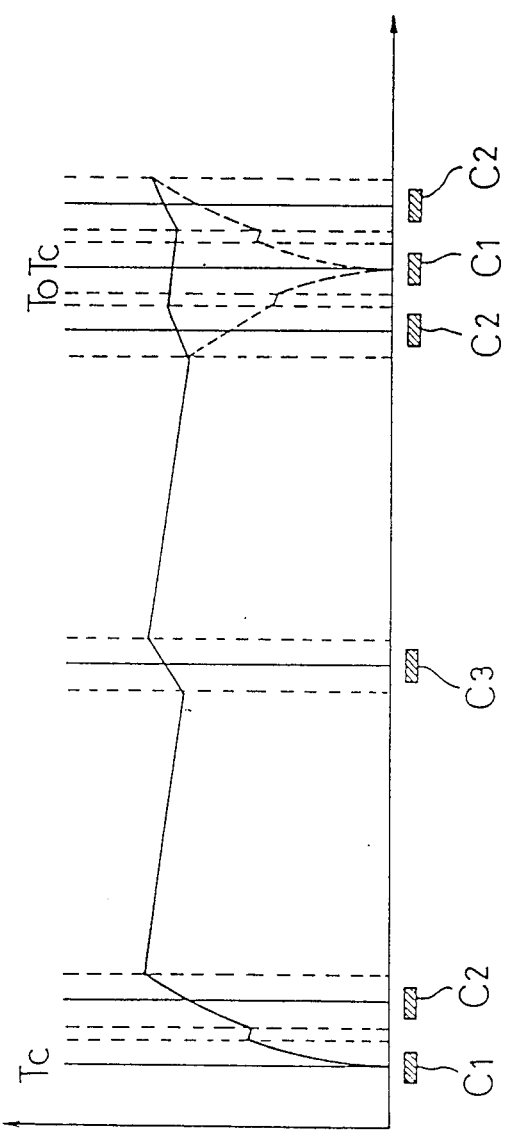
FIG. 18 is a view showing a relationship between primary coils and traveling speed.

FIG. 18 shows an example of relationship between the traveling speed of the conveyor cart A and each of the primary coils C1, C2 and C3 where the conveyor cart A is driven under speed control by the primary coils C1, C2 and C3.

As shown in FIGS. 3, 4, 9 and 10, the conveyor cart A comprises a main portion consisting of the drive section 3 and an article carrying deck 4, with a secondary conductor D lying horizontally in a lower portion of the cart.

More particularly, the conveyor cart A includes a pair of front and rear struts 5 interconnected by a belt-like frame 5A extending in the fore and aft direction of the cart, and the article carrying deck 4 is mounted on tops of the struts 5. A support frame 6 for supporting the drive section 3 is attached to each of the struts 5 to be only rotatable relative thereto.

The support frame 6 comprises a tubular frame 6a fitted around the strut 5 to be rotatable relative thereto, and a plate frame 6b attached to an outer periphery of the tubular frame 6a. A pair of right and left propelling wheels 7 are attached to mid-positions longitudinally of the plate frame 6b to be rotatable on a horizontal axis X, and a pair of right and left rollers 8 are attached to each of front and rear ends of the plate frame 6b to be rotatable on vertical axes Y.

The propelling wheels 7 are placed on the rail members 1A, and the rollers 8 are placed in contact with the right and left lateral walls of the main frame 1. The front and rear struts 5 extend through a slit defined between the right and left covers 2.

The secondary conductor D has a composite construction comprising an aluminum plate and a steel plate superposed on each other and, as shown in FIGS. 9 through 11, is divided into three parts D1 and D2 arranged in the fore and aft direction of the cart.

Front and rear conductor parts D1 of the three conductor parts D1 and D2 are each attached to a support member 9 attached to the plate frame 6b, and the intermediate conductor part D2 is attached at opposite ends thereof to the front and rear struts 5. The intermediate conductor part D2 defines arcuate front and rear end edges E2, and each of the front and rear conductor parts D1 defines an arcute end edge E1, the end edges being arcuate about the struts 5. This construction permits the conductor parts D1 and D2 to remain in close contact with one another when in a flexed state.

Therefore, as shown in FIG. 11, when the support frame 6 changes its direction through contact of the rollers 8 with the guide rail B, the secondary conductor D assumes a flexed posture in which the front and rear conductor parts D1 are flexed relative to the intermediate conductor part D2.

The number of secondary conductor parts D may be varied. Furthermore, in the described embodiment the rollers 8 for supporting the conveyor cart A act also as rollers for flexing the secondary conductors D, but separate rollers may be provided for the conductor flexing purposes.

Referring to FIGS. 1, 3, 4, 9 and 10, in order to hold the conveyor cart A immovable at a fixed position during loading and unloading operations at each of the stations ST, electromagnets 10 are attached to the bottom wall of the guide rail B to downwardly attract retaining members 11 mounted on the cart. As seen from FIG. 1, the electromagnets 10 are arranged at four positions, at the front and rear and at the right and left of the primary coil C1, to stop and retain the conveyor cart A by arresting it at four positions, at front and rear and right and left positions, of the cart. Further, as shown in FIGS. 3, 4, 9 and 10, the retaining members 11 are attached to opposite lateral sides of each of the front and rear conductor parts D1 to be located inwardly with respect to the right and left propelling wheels 7.

Therefore, one of the right and left propelling wheels 7 acts as fulcrum to hold the conveyor cart A against inclination even when there occurs a difference in attractive force between the right and left electromagnets 10 attracting the right and left retaining members 11 opposed thereto, respectively, or when there occurs a difference in distance from the right and left retaining members 11 to the respective rail members 1A of the guide rail B on which the right and left propelling wheels 7 are supported.

In the above embodiment, the retaining members 11 are provided at two positions transversely across the secondary conductor D and the electromagnets 10 are provided at the right and left sides to attract the right and left retaining members 11, respectively. However, a retaining member 11 may be provided at only one, middle position transversely of the cart to be attracted by a single electromagnet 10, for example.

Further, in the above embodiment, the retaining members 11 opposed to the electromagnets 10 are formed integral with the secondary conductor D, but they may be provided separately from the secondary conductor D. The number, attaching positions and other specific details of the electromagnets 10 and retaining members 11 are variable in many ways. For example, parts of the steel plate constituting the composite secondary conductor D may be used as the retaining members 11 to which the attractive force is applied. However, in all such varied constructions the electromagnets 10 and retaining members 11 should of course be located inwardly with respect to the right and left propelling wheels 7.

A control system for driving conveyor carts A by means of the primary coils C1, C2 and C3 will be described hereinafter.

Figure 2:
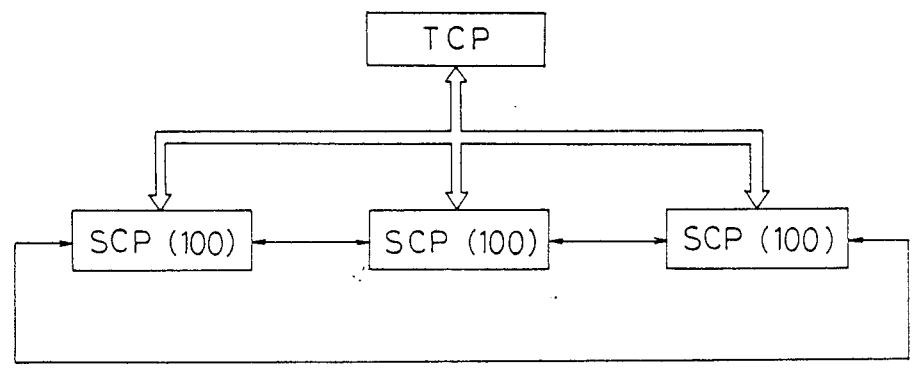
FIGS. 2 (A) and (B) are block diagrams showing controllers for the conveyor system.
Figure 2:
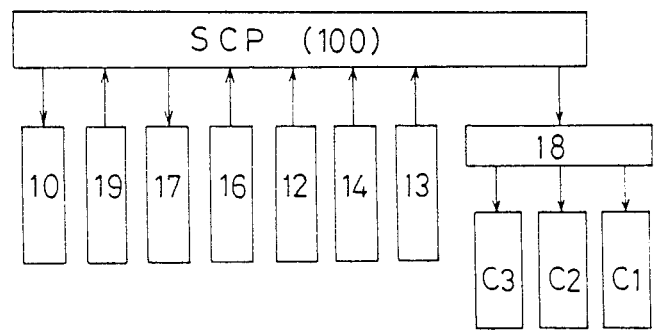

As shown in FIG. 2 (A), the control system includes a main controller TCP for controlling operation of the entire conveyor system, and a plurality of subcontrollers SCP connected to the main controller TCP for exchanging signals therewith through optical fiber cables or the like.

As shown in FIG. 1, each of the subcontrollers SCP controls a section of track K including one station primary coil C1, two accelerating and decelerating primary coils C2 and a plurality of intermediate accelerating primary coils C3.

The main controller TCP has principal functions to take note of the identification number of the conveyor cart A present in the section K under control by each of the subcontrollers SCP and to output to each subcontroller SCP the destination for the conveyor cart A standing at the station ST in each section K. For this purpose, each subcontroller SCP provides the main controller TCP with various data such as whether the conveyor cart A is present or not, the identification number of the conveyor cart A present, whether the conveyor cart A is loaded with articles or not, and a request to re-start the conveyor cart A standing at the station ST.

The conveyor cart A started on the basis of the destination data provided by the main controller TCP is driven to the station ST of destination under control by the subcontrollers SCP only, whereby loads of the main controller TCP are diminished.

The conveyor cart A is advanced from one section K to a next section K on the condition that there is no other conveyor cart A present in the next section K. To ensure this condition the subcontrollers SCP are interconnected to exchange information with one another regarding the presence or absence of conveyor carts A.

As shown in FIG. 2 (B), each of the subcontrollers SCP is connected to a two-phase sensor 12 for detecting the speed, distance of advance, and advancing direction of the conveying cart A that has advanced to the station primary coil C1, speed sensors 13 for detecting the speed of the conveying cart A advancing to the accelerating and decelerating primary coils C2 and intermediate accelerating primary coils C3, presence sensors 14 for determining times for beginning and ending the application of a propulsive force to the conveying cart A through the accelerating and decelerating primary coils C2 and intermediate accelerating primary coils C3, reader heads 16 for reading data stored in a magnet type memory plate 15 attached to the conveying cart A, writer heads 17 for writing data in the memory plate 15 after the conveying cart A has started from the respective stations ST, the described electromagnets 10 for stopping the cart, a propulsion setting device 18 for adjusting the propulsive force applied through the primary coils C1, C2 and C3, and a load sensor 19 for detecting articles loaded on the conveying cart A at the station ST.

As shown in FIGS. 5 and 6, the two-phase sensor 12 comprises two photo-interrupt type sensors 12a and 12b arranged in the fore and aft direction of the conveyor cart A and opposed to the station primary coil C1 to be subjected to photo-interruption by a slit plate 20 mounted on the belt-like frame 5A of the conveyor cart A.

The slit plate 20 defines slits 21 arranged at certain intervals longitudinally of the conveyor cart A and each having a certain width. The advancing direction of the conveyor cart A is detected on the basis of which of the two photosensors 12a and 12b is interrupted first. The speed of the conveyor cart A is detected on the basis of time taken from a first photo-interruption occurring to one of the two photosensors 12a and 12b to a second photo-interruption which occurs after the first photo-interruption is broken once. Further, the distance of advance of the conveyor cart A is detected on the basis of times of photo-interruption occurring to one of the two photosensors 12a and 12b. Since the two photosensors are disposed at a fixed position relative to the primary coil C1, the distance of advance as detected above constitutes data for indicating the position of conveyor cart A relative to the primary coil C1 or to the station ST.

Each of the speed sensors 13 comprises a photo-interrupt type sensor or a magnet type proximity sensor. As shown in FIGS. 3 and 6, the speed sensor is opposed to the accelerating and decelerating primary coil C2 or the intermediate accelerating primary coil C3 to detect detection pieces 22 attached to front and rear portions of the belt-like frame 5A of the conveyor cart A.

The detection pieces 22 each have a fixed length longitudinally of the conveyor cart A, and the advancing speed of the conveyor cart A is detected on the basis of time taken from the beginning to the end of detection of the detection piece 22.

The detection pieces 22 are provided at the front and rear of the conveyor cart A so that the advancing speed may be detected regardless of the advancing direction of conveyor cart A. In this case, however, a pair of speed sensors 13 are provided at the front and rear ends of each primary coil C2 or C3, respectively, and the detection by the speed sensor 13 at the end to which the conveyor cart A advances is adopted as its advancing speed.

Each of the presence sensors 14 comprises a photo-interrupt type sensor or a magnet type proximity sensor. As shown in FIG. 6, the presence sensor is opposed to the accelerating and decelerating primary coil C2 or the intermediate accelerating primary coil C3 to detect a portion of the slit plate 20 where slits are not defined.

The slit plate 20 has a certain length longitudinally of the conveyor cart A, and the presence sensor 14 detects the time for beginning the application of the propulsive force on the basis of the time at which the detection of the slit plate 20 begins, and the time for ending the application of the propulsive force on the basis of the time at which the detection of the slit plate 20 ends. The length of slit plate 20 corresponds to the predetermined distance that the conveyor cart A advances under the propulsive force, and the length of slit plate 20 is used to calculate the propulsive force to be applied as described later.

The presence sensor 14 begins the detection upon lapse of a predetermined time required for calculating the propulsive force after completion of the detection by the speed sensor 13 of the advancing speed.

As shown in FIGS. 3 and 7, the memory plate 15 includes a first and a second, read only memories $m_1$ and $m_2$ and a third, read and write memory $m_3$. The first memory $m_1$ includes eight bits b1–b8 arranged longitudinally of the conveyor cart A, the bit b1 at the front and the bit b8 at the rear being used to store data for determining the advancing direction of conveyor cart A, and the intermediate six bits b2–b7 being used to store the identification number of conveyor cart A. The third memory $m_3$ also includes eight bits B1–B2 arranged longitudinally of the conveyor cart A, the six bits B1–B6 from the front rearward being used to store the destination data, the next bit B7 being used to store weight data of the conveyor cart A, and the rearmost bit B8 being used to store parity check data. The second memory $m_2$, briefly, stores data for setting read and write timings for the respective bits of the first and third memories $m_1$ and $m_3$.

Each of the memories $m_1$, $m_2$ and $m_3$ of course stores the various data by combinations of the respective bits being magnetized at the N-pole or the S-pole or not being magnetized.

To add an explanation of the weight data of the conveyor cart A to be stored, the present embodiment assumes that the cart may be loaded with a maximum of two articles Z of one kind. The data to be stored correspond to the situation where the cart is not loaded with any articles Z, the situation where the cart is loaded with one article Z, and the situation where the cart is loaded with two articles Z. In calculating the propulsive force which will be described later, the weight of conveyor cart A is the sum of a prestored weight of the conveyor cart A per se and a prestored weight of one article multiplied by the number of articles loaded.

To be brief, each of the reader heads 16 is disposed at an end of each section K and comprises reading sections for reading the data stored in the memories $m_1$, $m_2$ and $m_3$ of the memory plate 15.

Each of the writer heads 17 is opposed to the station primary coil C1 for writing the destination data provided by the main controller TCP and the detection data provided by the load sensor 19.

As shown in FIG. 8, the load sensor 19 comprises a pair of front and rear photo-interrupt type sensors 19a and 19b. When a photo-interruption occurs to neither of the two photosensors 19a and 19b, the situation is detected where the cart is not loaded with article Z. When a photo-interruption occurs to one of the two photosensors 19a and 19b, the situation is detected where the cart is loaded with one article Z. When the photo-interruption occurs to both of the two photosensors 19a and 19b, the situation is detected where the cart is loaded with two articles Z.

The propulsion setting device 18 has the function to select which of the primary coils C1, C2 and C3 should be electrified and the function to adjust the propulsive force by varying the frequency of alternating current for electrification.

The propulsive force applied through the primary coils C1, C2 and C3 is derived from the following equation (i):

$$F = \frac{(V_1^2 - V_0^2)}{2gl} W \qquad (i)$$

wherein F is the propulsive force, l is a distance from the present position of the cart to a destination, g is the acceleration of gravity, $V_0$ is a velocity at the present position, $V_1$ is a velocity at the destination, W is the weight of the conveyor cart A. The propulsive force thus derived is either positive or negative. The positive propulsive force is used for accelerating the cart, and the negative propulsive force for declearating the cart.

A frequency corresponding to the propulsive force F derived from the above equation (i) is measured through tests and is stored in advance. Thus the frequency corresponding to the calculated propulsive force F is determined, and the primary coils C are electrified with this frequency.

Where the above tests are conducted on a conveyor cart A standing still, the effective value of the propulsive force varies with the moving speed of the conveyor cart A and therefore the frequency set as above should desirably be amended in accordance with the speed. The amendment is of course unnecessary where the value is measured and stored in advance by taking the speed into account at the testing time.

When the main controller TCP provides a destination command for the conveyor cart A standing at the station ST, the subcontroller SCP causes the station primary coil C1 to start and accelerate the cart, the accelerating and decelerating primary coil C2 to accelerate the cart to a high speed, and the intermediate accelerating primary coil C3 to accelerate the cart to maintain the cart at the high speed, whereby the conveyor cart A is advanced toward the station ST of destination. As the conveyor cart A approaches the station of destination, the accelerating and decelerating primary coil C2 is actuated to decelerate the cart to a low speed, and the station primary coil C1 further decelerates the cart to a creep speed. When the cart reaches a position close to a target stopping point at the station ST, the electromagnet 10 is actuated to take the attracting action to stop the conveyor cart A at the target stopping point. In the case that the conveyor cart A travels through a section K in its advance toward the station ST of destination, the accelerating and decelerating primary coils C2 in the section K are also actuated to accelerate the conveyor cart A. Furthermore, when there is another conveyor cart A in a section K ahead of the running conveyor cart A, the accelerating and decelerating primary coil C2 and station primary coil C1 are used to stop the conveyor cart A at the station ST in the section K through which the conveyor cart A is running at present.

The subcontroller SCP writes the destination data and weight data on the memory plate 15 when starting the conveyor cart A from the station ST, and electrifies the primary coils C1, C2 and C3 after deciding whether to stop the conveyor cart A or allow it to pass on the basis of data read by the reader head 16 when the conveyor cart A enters each section K.

Furthermore, the subcontroller SCP controls the electrification of the accelerating and decelerating primary coils C2 and intermediate accelerating primary coils C3 on the basis of the weight data of the conveyor cart A, data detected by the speed sensor 13 and data detected by the presence sensor 14, and controls the electrification of the station primary coil C1 on the basis of data detected by the two-phase sensor 12.

The running mode of the conveyor cart A will be described hereinafter in parallel with explanations of how the subcontroller SCP carries out the control operations.

Figure 12:
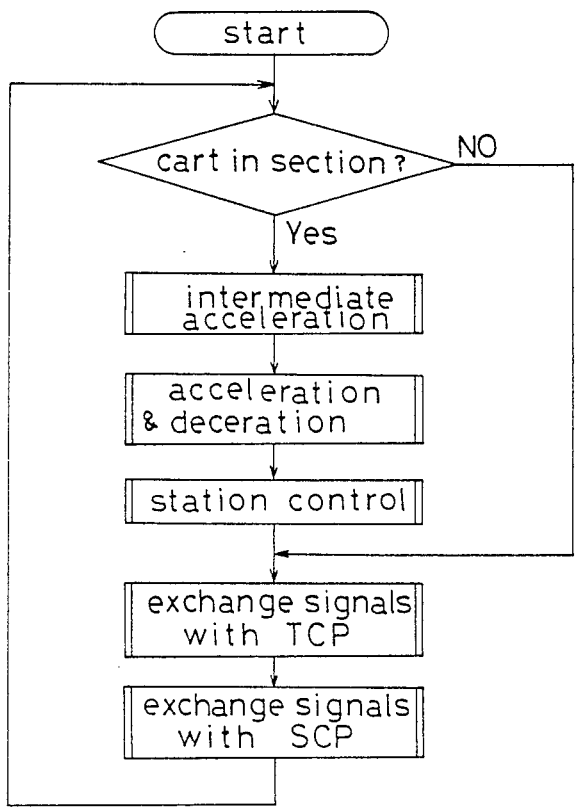
FIGS. 12 through 17 are flowcharts showing control operations.

As shown in FIG. 12, the subcontroller SCP checks whether or not a conveyor cart A is present in the section K under control by the subcontroller SCP, on the basis of whether or not the conveyor cart A has passed the primary coil C disposed at the end of the section K after the reader head 16 reads the memory plate 15. If the conveyor cart A is not present, the subcontroller SCP immediately exchanges signals with the main controller TCP and other subcontrollers SCP.

If the conveyor cart A is present in the section K, the subcontroller SCP exchanges the above signals after carrying out an intermediate acceleration control operation for actuating the intermediate accelerating primary coils C3, an acceleration and deceleration control operation for actuating the accelerating and decelerating primary coil C2 and a station control operation for actuating the station primary coil C1.

Figure 13:
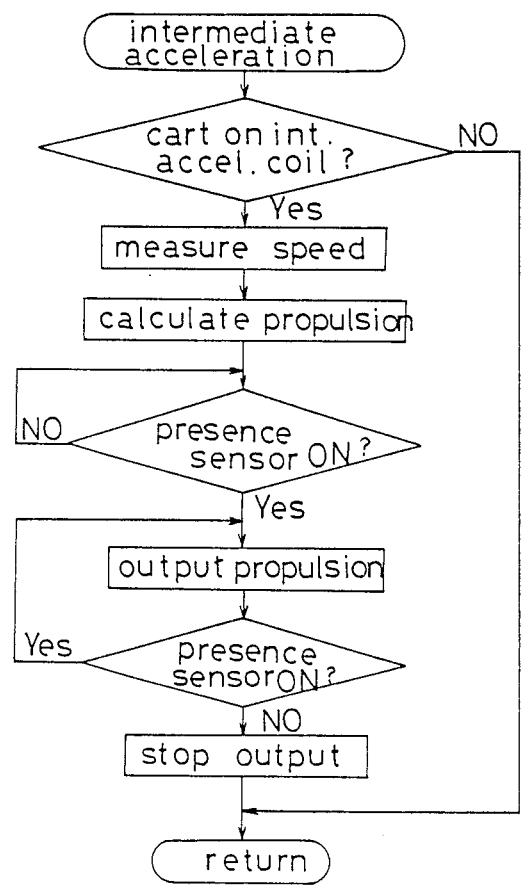

As shown in FIG. 13, the intermediate acceleration control operation is carried out by checking whether or not the conveyor cart A has advanced onto each of the intermediate accelerating primary coils C3 which is ascertained by checking whether or not the speed sensor 13 has detected the detection piece 22. If the conveyor cart A has not advanced to that extent, the subcontroller SCP carries out the next, acceleration and deceleration control operation.

If the conveyor cart A has advanced on to the primary coil C3, the advancing speed of the conveyor cart A is measured on the basis of data provided by the speed sensor 13. Then a propulsive force is derived from the foregoing equation (i) on the basis of the difference between the advancing speed and a target speed to which the conveyor cart A should be accelerated, the weight of the conveyor cart A, and a predetermined distance that the conveyor cart A advances while the propulsive force is being applied thereto.

Thereafter, checking is repeated as to whether the presence sensor 14 gives a detection result or not. If it does, the intermediate accelerating primary coil C3 is electrified to generate the propulsive force calculated as above.

After the electrification the checking is repeated as to whether the presence sensor 14 detects the cart or not. When the cart is no longer detected, the electrification of the primary coil C3 is stopped, that is its output is stopped.

This intermediate acceleration control operation corresponds to electrification control means for intermediate acceleration 100C that controls the electrification of the intermediate accelerating primary coils C3.

Thus, the electrification control means for intermediate acceleration 100C calculates the propulsive force by using the weight of the conveyor cart A, and accelerates the conveyor cart A by generating the propulsive force calculated. Therefore, the conveyor cart A, regardless of its weight, is accelerated to the target speed with the least of errors. This results in the advantageous running of the conveyor cart A that the conveyor cart A runs from one station ST to another in a constant time, for example.

Figure 14:
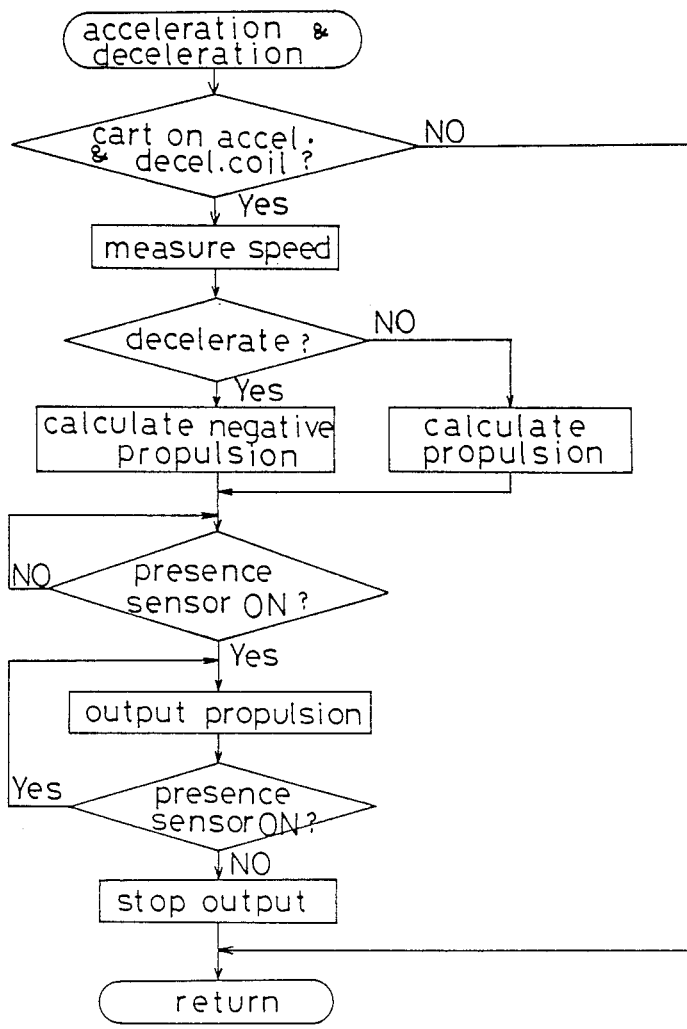

As shown in FIG. 14, the acceleration and deceleration control operation is carried out by checking whether or not the conveyor cart A has advanced onto one of the accelerating and decelerating primary coils C2 which is ascertained by checking whether or not the speed sensor 13 has detected the detection piece 22. If the conveyor cart A has not advanced to that extent, the subcontroller SCP carries out the next, station control operation.

If the conveyor cart A has advanced onto the primary coil C2, the advancing speed of the conveyor cart A is measured on the basis of data provided by the speed sensor 13. Then a checking is made whether the conveyor cart A should be accelerated or decelerated, on the basis of the destination data.

In the case of deceleration, a negative propulsive force is derived from the foregoing equation (i) on the basis of the difference between the advancing speed and a target speed to which the conveyor cart A should be decelerated, the weight of the conveyor cart A, and a predetermined distance that the conveyor cart A advances while the propulsive force is being applied thereto.

In the case of acceleration, a propulsive force is calculated as in the intermediate acceleration control operation described before.

After the propulsive force or negative propulsive force is calculated, the accelerating and decelerating primary coil C2 is electrified to generate the propulsive force or negative propulsive force on the basis of the detection data provided by the presence sensor 14 as in the intermediate acceleration control operation.

The accelerating and decelerating primary coil C2 is disposed adjacent the station primary coil C1 for applying the negative propulsive force to the conveyor cart A which is to be stopped on the station primary coil C1. Therefore, the conveyor cart A advancing toward the station ST is first decelerated by the accelerating and decelerating primary coil C2 adjacent the station primary coil C1, and then decelerated by the station primary coil C1 whereby the conveyor cart A stops at a target stopping point Tc.

Consequently, the station primary coil C1 and the accelerating and decelerating primary coil C2 disposed adjacent thereto may be of the same specifications as the intermediate accelerating primary coil C3, to be effective for suitably decelerating the conveyor cart A moving at high speed and for stopping it at the target stopping point Tc. The station primary coil C1 need not comprise a large coil capable of decelerating the high speed conveyor cart A on its own. By utilizing the primary coils C1, C2 and C3 of the same specifications for the different purposes, the system is simplified and at the same time is capable of efficient conveying operations by moving the conveyor cart A at a highest possible speed.

It will be noted that the above acceleration and deceleration control operation corresponds to electrification control means for acceleration and deceleration 100B that controls the electrification of the accelerating and decelerating primary coil C2.

Figure 15:
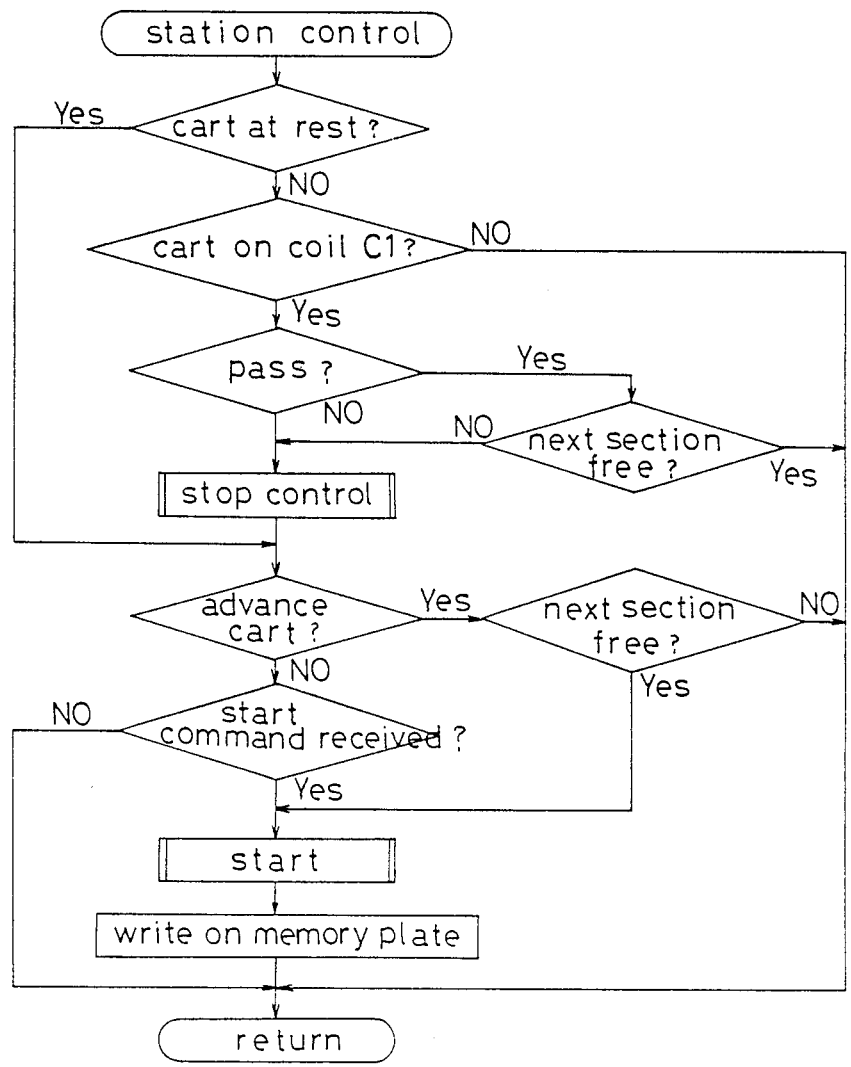

Referring to FIG. 15, in the station control operation a checking is made whether or not the conveyor cart A is standing still. If it is not, a checking is made whether or not the conveyor cart A has advanced onto the station primary coil C1, on the basis of data provided by the two-phase sensor 12. If the conveyor cart A has not advanced to that extent, the program moves on to a next exchange of signals.

If the conveyor cart A has advanced to that extent, a checking is made whether or not the conveyor cart A should be allowed to advance farther onward. If the conveyor cart A should be stopped, a stopping control is effected.

If the conveyor cart A should be allowed to advance, a checking is made whether or not conditions are met for entry of the conveyor cart A to a next section K. If the latter is in order for entry, the program moves on to the next exchange of signals. Otherwise the foregoing stopping control is effected.

After effecting the stopping control or where the conveyor cart A is found to be standing still, the checking is made whether the conveyor cart A should be allowed to advance or not.

If the conveyor cart A should not be allowed to advance, a checking is made whether or not a start command has been provided by the main controller TCP. If it has not been provided, the program moves on to the next exchange of signals.

If the start command has been provided, a starting control is effected. Thereafter destination data from the main controller TCP and detection data from the load sensor 19 are written on the memory plate 15 by means of the write head 17.

If the above checking shows that the conveyor cart A standing still should be allowed to advance onward, a checking is made whether or not the next section K is free to enter. If it is, the starting control is effected. If it is not free, the program moves on to the next exchange of signals.

The exchange of signals with the main controller TCP and subcontrollers SCP should be clear from the preceding description and therefore is not described here.

The stopping control in the station control operation will be described now.

Figure 19:
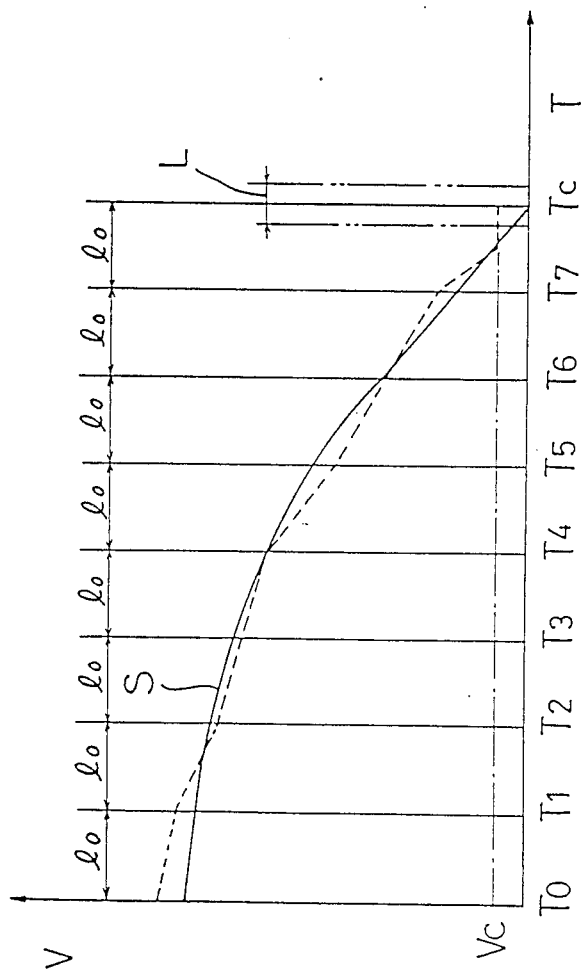
FIG. 19 is a view showing a deceleration mode.

As shown in FIG. 19, the stopping control is effected while detecting the running speed or velocity V of the conveyor cart A and the position of conveyor cart A relative to the target stopping point Tc which are detected by the two-phase sensor 12. The station primary coil C1 is electrified under control on the basis of detection data provided by the two-phase sensor 12 to decelerate the conveyor cart A to predetermined target speeds at positions relative to the target stopping point Tc, namely following a target curve S described by a uniform deceleration, such that the more the cart approaches the target stopping point Tc, the slower the cart speed becomes. By the time the conveyor cart A is near the target stopping point Tc, the conveyor cart A has been decelerated to a creep speed Vc to be ready for an immediate stopping. The conveyor cart A is allowed to run constantly at the creep speed Vc until the conveyor cart A enters a position setting range L in which a position setting to the target stopping point Tc may be effected by the electromagnet 10. Once the conveyor cart A enters the position setting range L, the propulsive force generation by the primary coil C1 is discontinued and the electromagnet 10 is actuated thereby to stop the conveyor cart A at the target stopping point Tc.

For decelerating the conveyor cart A to the predetermined target speeds, a propulsive force is derived utilizing the foregoing equation (i) when the conveyor cart A arrives at a predetermined position $T_0$ short of the target stopping point Tc, on the basis of the running speed detected, a target speed after the conveyor cart A advances a predetermined distance $l^0$ from that point of time, and the predetermined weight of the conveyor cart A such as the weight of the conveyor cart A per se. The propulsive force thus derived is applied while the conveyor cart A advances the predetermined distance $l^0$. (This portion of control is referred to hereinafter as the first deceleration control.)

After generating the propulsive force, the weight of the conveyor cart A is calculated by substituting the conditions for generating the propulsive force the previous time in the following equation (ii) which is developed from the foregoing equation (i):

$$W = \frac{2glF}{V_1^2 - V_0^2} \quad \text{(ii)}$$

wherein $V_1$ is a current velocity, $V_0$ is a velocity before the propulsive force is generated, and F is the propulsive force generated.

After the weight of the conveyor cart A is calculated, a propulsive force is derived from the equation (i) on the basis of the weight calculated, the running speed at the point of time $T_1$, and a target speed after the conveyor cart A has advanced the predetermined distance $l_0$ since the time $T_1$. The propulsive force thus derived is generated while the conveyor cart A advances this predetermined distance $l_0$. However, where the deceleration does not result in the creep speed, the propulsive force is repeatedly derived from the equation (i) at each point of time $T_1$-$T_1$ after the conveyor cart A advances the predetermined distance $l^0$, while deriving the weight of the conveyor cart A, on the basis of the running speeds before and after the previous deceleration and other factors. (This is referred to hereinafter as the second deceleration control.)

The first and second deceleration controls correspond to electrification control means for station deceleration 100A according to the present invention. In sum, the propulsive force to be generated is calculated each time the conveyor cart A moves the predetermined distance, on the basis of a difference between a current running speed and a target speed at a point of time that the conveyor cart has advanced from the current position, the predetermined distance, and the weight of the conveyor cart. The conveyor cart may be decelerated to a target speed regardless of variations in a distance between the primary coil C1 and the secondary conductor D, variations in the performance of the primary coil C1, variations in the running resistance and the like, by deriving the weight of the conveyor cart for the second and subsequent calculations of the propulsive force on the basis of speed variations resulting from the propulsive force applied the previous times. Moreover, as already described, the conveyor cart is decelerated while being maintained in the uniform acceleration state, which is effective to prevent the articles carried by the conveyor cart from losing its balance and to shorten the moving distance required for the cart to stop.

The described constant speed running is achieved by controlling the electrification of the primary coil C1, while utilizing the detection data provided by the two-phase sensor 12, to maintain the creep speed.

Figure 16:
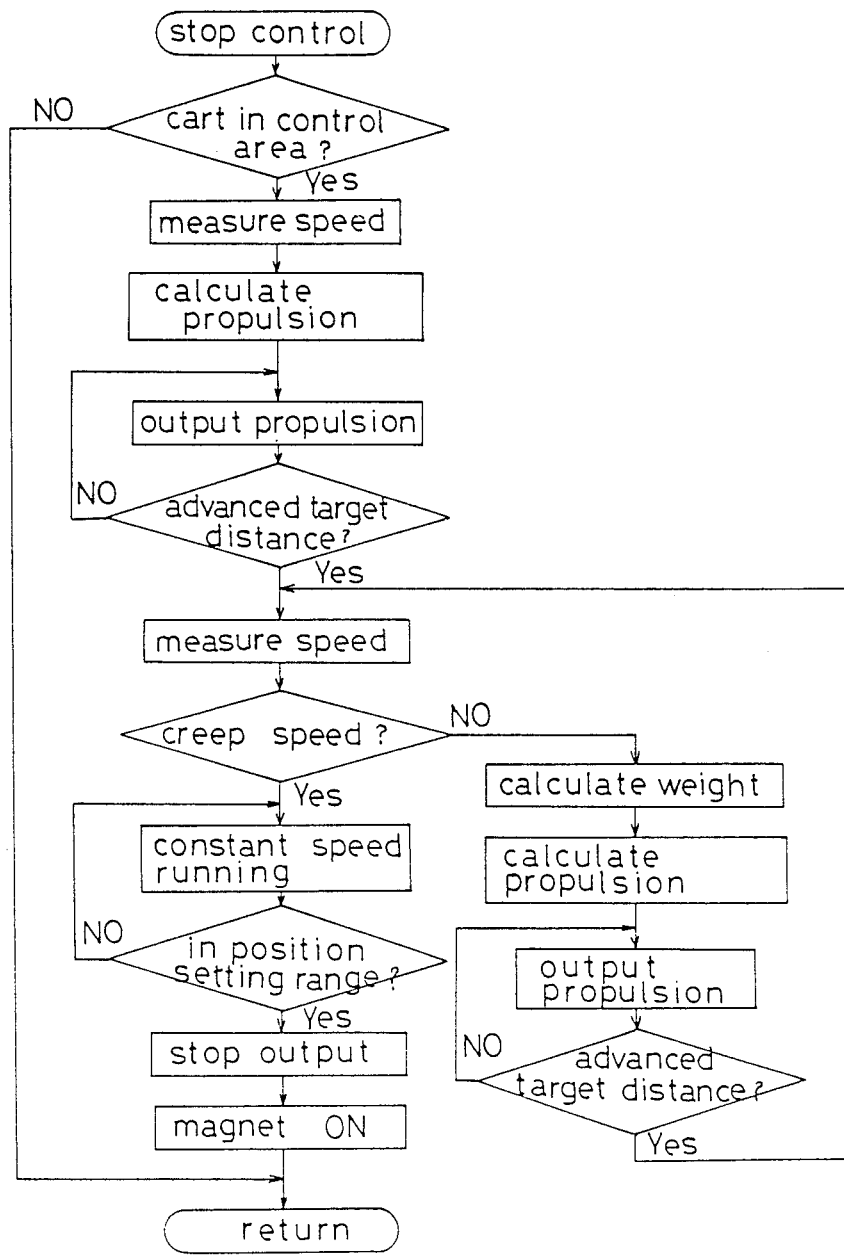

How the stopping control is executed will particularly be described hereinafter with reference to the flowchart shown in FIG. 16.

Whether or not the conveyor cart A has entered a control area is checked on the basis of data provided by the two-phase sensor 12, and the following operations are carried out only when the conveyor cart A has entered the control area:

The first deceleration control is effected while measuring the running speeds of conveyor cart A at the predetermined positions short of the target stopping point, calculating the propulsive force by utilizing the predetermined weight of the conveyor cart A, outputting the propulsive force thus derived, and checking whether or not the conveyor cart A has advanced the target distance.

After effecting the first deceleration control, the running speed is measured and is checked if it is lower than the creep speed.

If the running speed remains higher than the creep speed, the second deceleration control is effected while calculating the weight of the conveyor cart A by utilizing the running speeds before and after the first deceleration control, calculating the propulsive force utilizing the weight data thus derived, outputting the propulsive force, and checking whether or not the conveyor cart A has advanced the target distances.

However, this second deceleration control is repeated after its first execution, while measuring the running speed and checking whether it is lower than the creep speed or not, until the running speed becomes lower than the creep speed.

When the running speed is reduced to or below the creep speed, the conveyor cart A is allowed to run at the creep speed until it reaches the position setting range of the electromagnet 10. When the conveyor cart A reaches the position setting range, the output of the propulsive force is discontinued and the electromagnet 10 is actuated to stop the conveyor cart A at the target stopping point.

The electrification control means for station deceleration 100A and the electrification control means for acceleration and deceleration 100B include reading means 16 comprising the reader head for reading the destination data stored in the memory medium 15 comprising the memory plate mounted on the conveyor cart A.

Thus, the destination data for the conveyor cart A are stored in the memory medium 15 mounted on the conveyor cart A, and the electrification control means 100A and 100B provide the electrification controls for the primary coils C1 and C2 while judging whether the conveyor cart A should be stopped or allowed to advance farther onward on the basis of the data read through the reading means 16. Therefore, the main controller TCP, which controls the operation of the system as a whole, does not participate in the electrification control for the primary coils C1 and C2 although it of course participates in the other functions such as writing the destination data in the memory medium 15. As a result the data controlled by the main controller TCP are reduced, thereby permitting an increased number of conveyor carts A to be placed under control and reducing the range of modification to be made to the software in the event of changes in and extension of the system layout.

The starting control in the station control operation will be described now.

The starting control is effected while detecting the running speed of the conveyor cart A and the position of conveyor cart A relative to the target stopping point which are detected by the two-phase sensor 12. The station primary coil C1 is electrified under control on the basis of detection data provided by the two-phase sensor 12 to accelerate the conveyor cart A to predetermined target speeds at positions relative to the target stopping point such that the farther the cart advances from the target stopping point, the faster the cart speed becomes. In particular, the starting control operation includes a first acceleration control corresponding to the first deceleration control in the stopping control operation and a second acceleration control corresponding to the second deceleration control in the stopping control operation.

In other words, the first acceleration control is effected for starting the conveyor cart A, in which a propulsive force is derived utilizing the foregoing equation (i) on the basis of a target speed after the conveyor cart A advances a predetermined distance from the starting point of time, and the predetermined weight of the conveyor cart A. The propulsive force thus derived is applied while the conveyor cart A advances the predetermined distance.

After the first acceleration control, the second acceleration control is effected in which the weight of the conveyor cart A is derived from the equation (ii) utilizing acceleration data, and a propulsive force is calculated on the basis of the weight calculated, the running speed at the point of time, and a target speed after the conveyor cart A has advanced the predetermined distance since that point of time. The propulsive force thus derived is generated while the conveyor cart A advances this predetermined distance.

Figure 17:
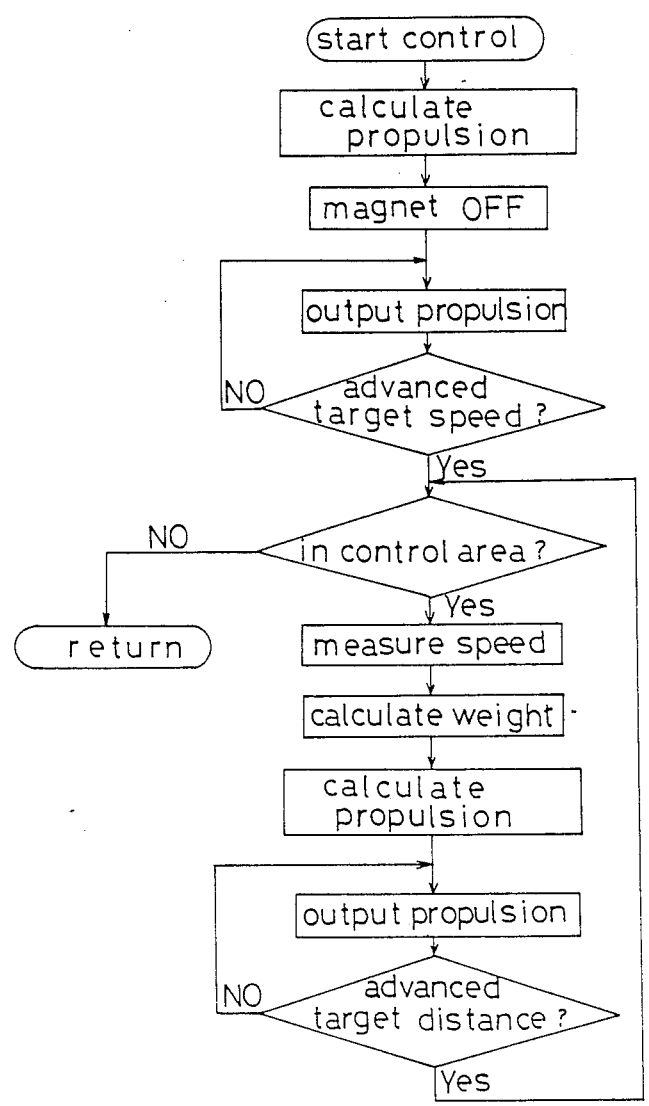

How the starting control is executed will particularly be described hereinafter with reference to the flowchart shown in FIG. 17.

The first acceleration control is effected in which the propulsive force is calculated by utilizing the predetermined weight of the conveyor cart A, the electromagnet 10 is brought out of operation, and then the propulsive force derived is output until the conveyor cart A advances the predetermined distance.

After effecting the first acceleration control, a checking is made whether the conveyor cart A is in the control area or not, and the second acceleration control is effected while the conveyor cart A is in the control area.

In particular, the second acceleration control is effected while measuring the running speed, calculating the weight of the conveyor cart A by utilizing the running speeds before and after the first acceleration control, calculating the propulsive force utilizing the weight data thus derived, outputting the propulsive force, and checking whether or not the conveyor cart A has advanced the target distance.

This second deceleration control is repeated until the conveyor cart A leaves the control area. In this case the weight of the conveyor cart A is calculated by utilizing the running speeds before and after the previous execution of the second acceleration control.

In practising the present invention, various equations are conceivable for calculating the propulsive force and the amendment to be made to the propulsive force is variable with the equations.

Further, the propulsive force generated through the primary coil C1 may be adjusted in many varied ways such as by voltage adjustment. Other elements necessary in working the invention may also have varied specific arrangements. For example, the starting control operation may be carried out in the same mode as the intermediate acceleration control, that is to generate a propulsive force calculated only once before starting the conveyor cart on the basis of a distance corresponding to the range of propulsion by the primary coil C1, a target speed at a point of time that the cart has advanced that distance, the cart weight and so forth. The accelerating and decelerating primary coils C2 may be dispensed with, in which case the station primary coil C1 acts to carry out the accelerating and decelerating functions as well.

The present invention is applicable also to the magnetic levitation system in which the conveyor cart A is lifted by magnetism above the guide rail B.

The described conveyor system may be improved in various ways as hereinafter described. The elements and constructions so far described are affixed with like reference numerals and their explanations are not repeated in the description to follow.

Referring to FIGS. 20 through 23, the conveyor cart shown therein comprises an emergency brake means 110 including a pair of right and left braking pieces 113 for braking the conveyor cart by contacting the main frame 1 of the guide rail B, respectively. These braking pieces 113 are mounted on lateral ends of a pair of right and left brake levers 114a and 114b attached, to be pivotable on vertical axes Z, to the support frame 6 above the rearmost rollers 8 with respect to the direction of movement of the conveyor cart A, respectively. A spring 115 is mounted between the brake levers 114a and 114b to bias the brake levers 114a and 114b outwardly of the conveyor cart A. The lefthand brake lever 114a carries a brake actuating lever 118 to be pivotable on a vertical axis Q at an extreme end thereof, the brake actuating lever carrying an engaging pin 117 at an extreme end thereof. The engaging pin 117 acts as retainer member to retain the braking pieces 113 in a brake releasing state by engaging a recess 116 defined in an extreme portion of the righthand brake lever 114b.

Figure 20:
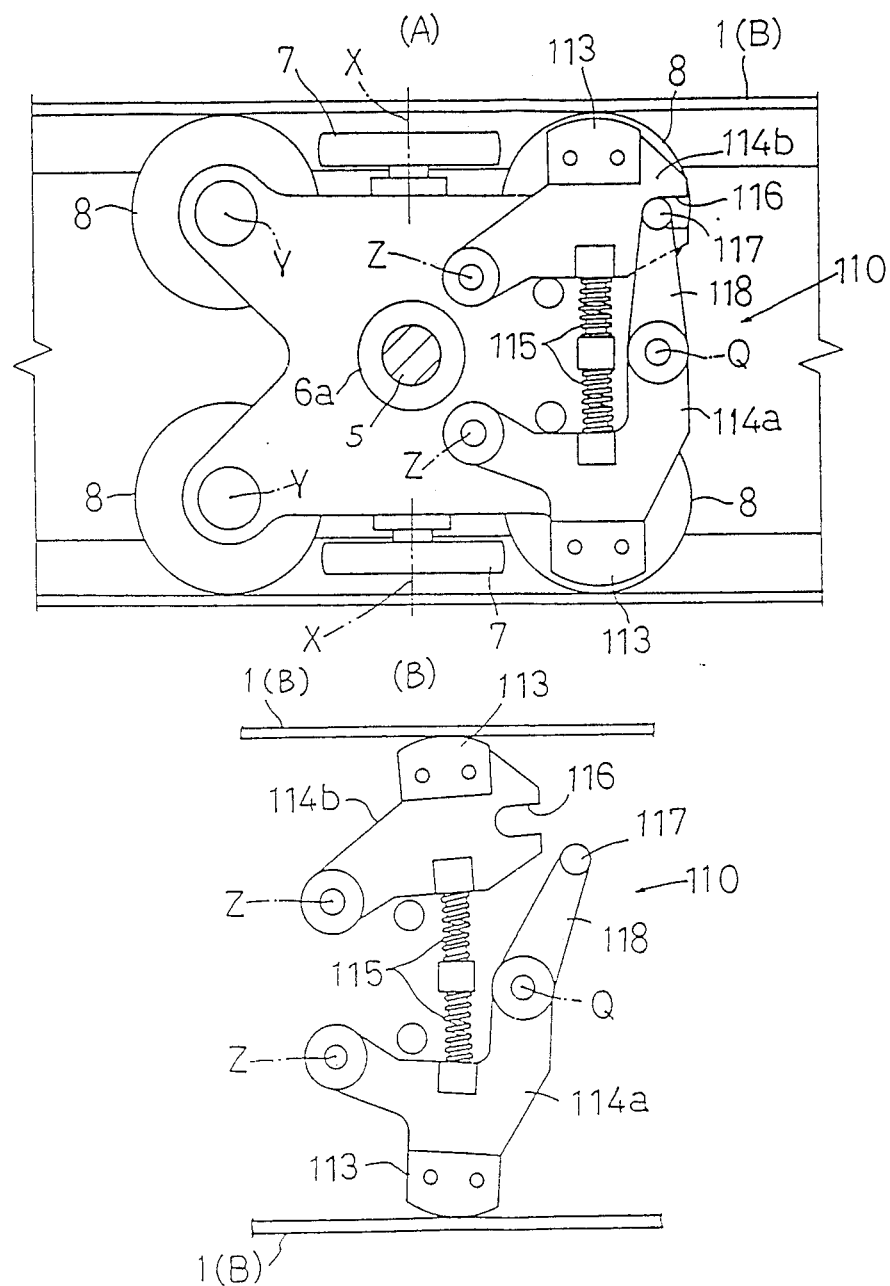
FIGS. 20 through 23 are views showing a conveyor system according to another embodiment including brake means and brake operating means, FIGS. 20 (A) and (B) being plan views of the brake means and brake operating means, FIG. 21 being a rear view in vertical section of the conveyor cart and guide rail, FIG. 22 being a section taken on line a—a of FIG. 21, FIG. 23 being a side view of the brake operating means.

As shown in FIG. 20 (A), the braking pieces 113 may be retained in the brake releasing state against the biasing force of the spring 15 by placing the engaging pin 117 attached to the extreme end of the brake actuating lever 118 in engagement with the recess 116 defined in the extreme portion of the righthand brake lever 114b. Conversely, as shown in FIG. 20 (B), the right and left braking pieces 113 are caused to project outwardly of the conveyor cart A into contact with the main frame 1 of the guide rail B to apply the brakes by releasing the engagement between the engaging pin 117 and the recess 116 by means of a brake operating means 111 provided on the guide rail B to be described below.

Figure 21:
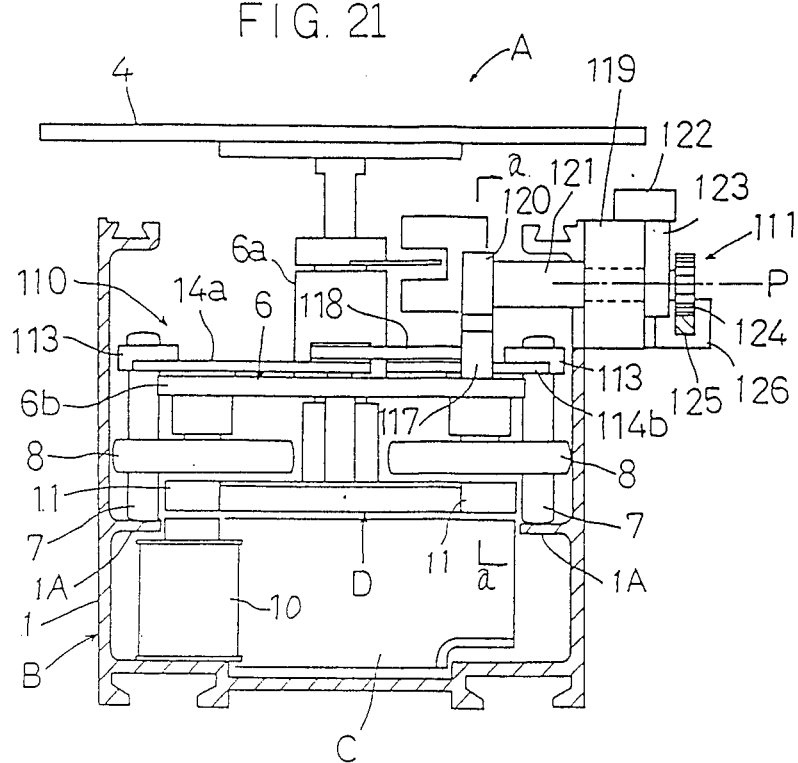
Figure 22:
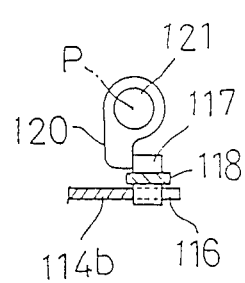
Figure 23:
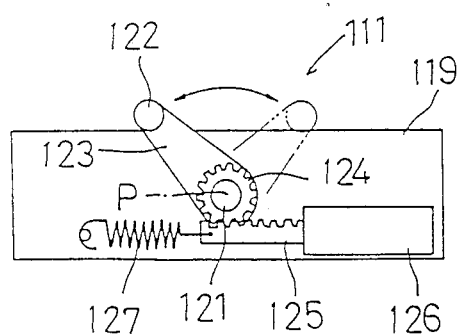
Figure 24:
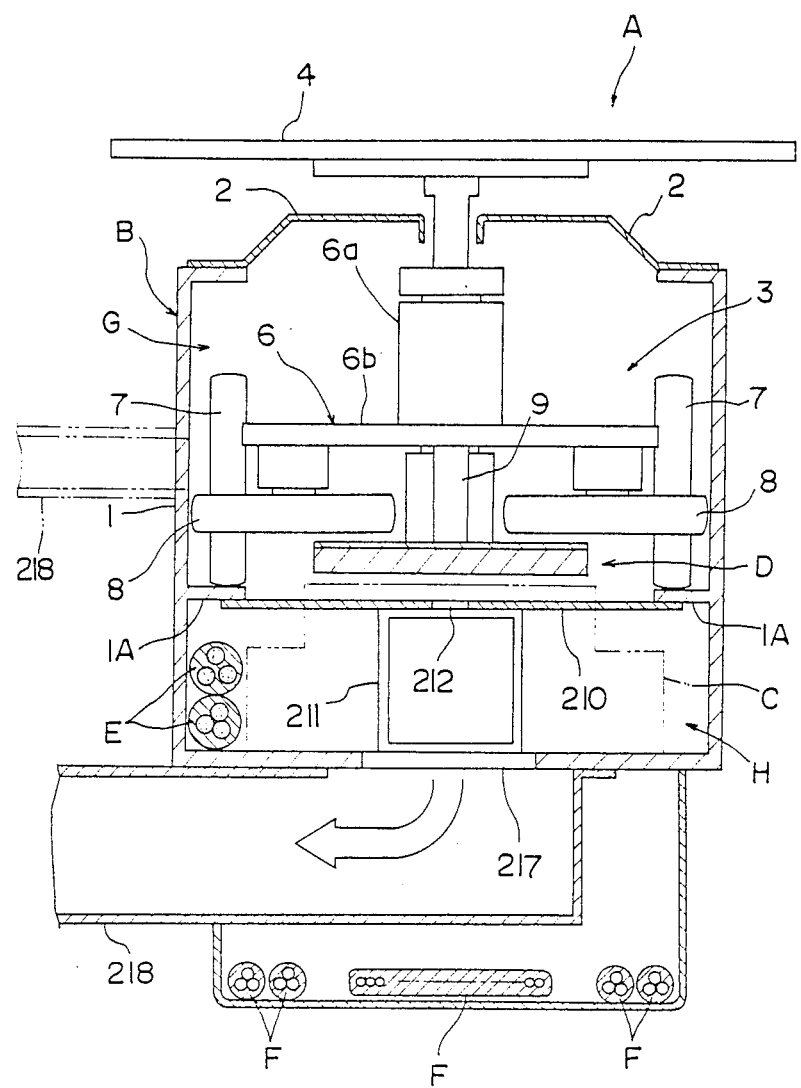
FIGS. 24 through 27 are views showing a conveyor system according to a further embodiment including suction devices for drawing dust, FIG. 24 being a front view of the guide rail, FIG. 25 being a broken away side view of the guide rail, FIG. 26 being a broken away front view showing how a suction device is connected to the guide rail, and FIG. 27 being a side view of the suction device.
Figure 25:
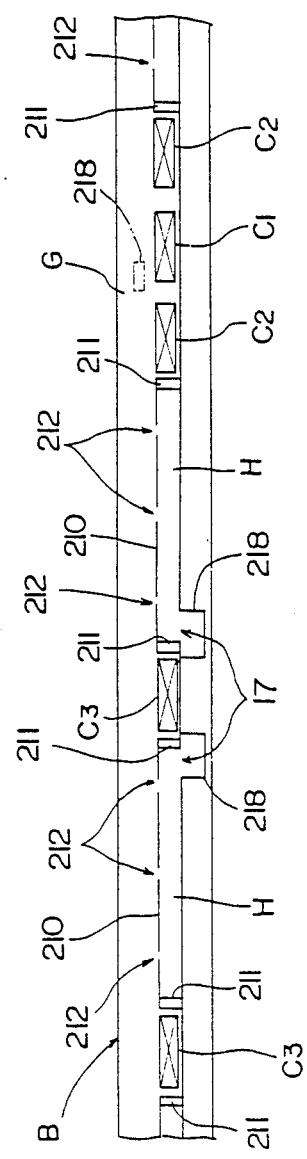

As shown in FIGS. 21 through 23, the brake operating means 111 comprises a brake operating lever 120 attached, to be pivotable on a horizontal axis P, to a support member 119 removably mounted on an outer face of the righthand lateral wall of the guide rail B, and a position limiting lever 123 connected to a support axis 121 of the lever 120. The position limiting lever 123 carries a pin 122 for limiting a pivoting range of the brake operating lever 120 by contacting an upper surface of the support member 119. The brake operating means further comprises a gear 124 for rotating the support axis 121, a rack 125 in mesh with the gear 124, a solenoid 126 for drawing the rack 125 when energized, and a spring 127 for drawing the rack 125 in a direction to project from the solenoid 126.

When stopping the conveyor cart A at a time of emergency, the brake operating lever 120 is moved to a position to project downwardly. The brake operating lever 120 then collides with the engaging pin 117 retaining the brake means 110 on the conveyor cart in the brake releasing state, thereby to disengage the engaging pin 117 from the recess 116.

The brake operating lever 120 is pivotable to retract to and be retained in a brake releasing position above the engaging pin 116 which functions to retain the brake means 110 on the conveyor cart in the brake releasing state. This is achieved by connecting the solenoid 126 to a power source (not shown) that provides power to the primary coil C1, and electrifying the solenoid 126 to draw the rack 125 against the biasing force of the spring 127.

When the solenoid 126 is de-energized owing to power failure or the like, the brake operating lever 120 automatically moves to the position to project downwardly under the biasing force of the spring 127. As the conveyor cart A passes where the brake operating lever 120 projects downwardly, the brake operating lever 120 collides with the engaging pin 117 retaining the right and left brake levers 114a and 114b of the conveyor cart A in the brake releasing state. As a result, the braking pieces 113 assume a braking state projecting outwardly of the conveyor cart A into contact with the right and left lateral walls of the guide rail B, thereby to stop the conveyor cart A automatically.

Accordingly, when a control trouble is eliminated or when power supply is resumed to energize the solenoid 126 again, the brake operating lever 120 automatically returns to the brake releasing position. The conveyor cart A is in position on the primary coil C1 at the station ST when the brakes are released. Thus, the conveyor cart A may readily be put to service by returning the right and left brake levers 114a and 114b to the brake releasing position.

The conveyor system shown in FIGS. 24 through 27 includes suction devices K for checking dust scattering from the guide rail B. More particularly, the guide rail B includes a patition plate 210 in a portion thereof between two adjacent intermediate accelerating coils C3. The partition plate 210 divides that guide rail portion into a running space G through which the drive section 3 of the conveyor cart runs and a ventilating space H. The partition plate 210 is supported at opposite ends thereof by support members 211 of rectangular pipe shape secured to bottom walls of the main frame 1 of the guide rail B, and is placed in contact with undersurfaces of the rail members 1A. The partition plate 210 defines a plurality of vents 212 arranged at intervals in the direction of movement of the conveyor cart for intercommunicating the running space G and the ventilating space H. Each of the suction devices K is connected to two adjacent ventilating spaces H.

The illustrated suction device K is well suited to a down type clean room, and downwardly discharges air flows from a suction blower 213 through a HEPA filter 214.

Figure 27:
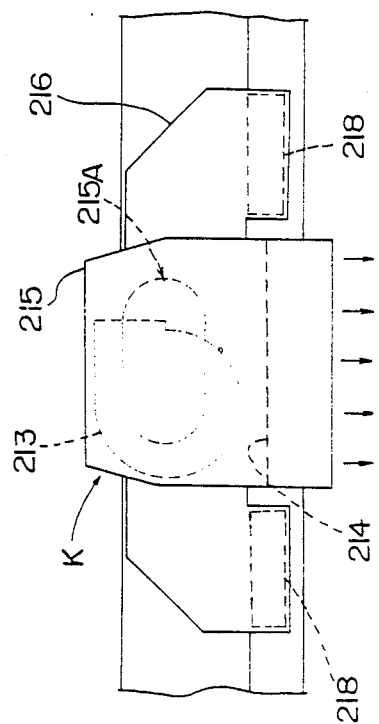
Figure 26:
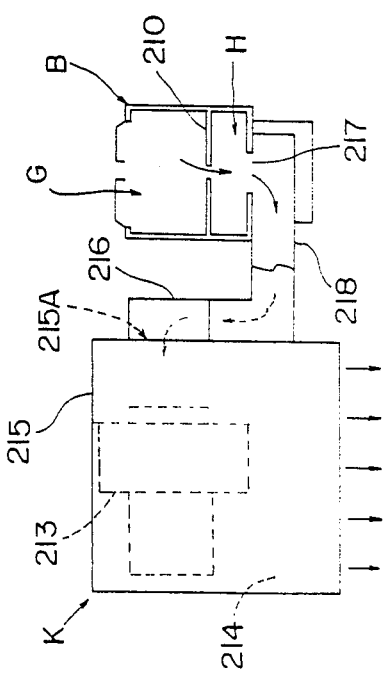

More particularly, as shown in FIGS. 26 and 27, the suction device K comprises a main case portion 215 housing the suction blower 213 and the HEPA filter 214, a first duct 216 communicating with an inlet 215A of the main case portion 215, and a pair of second ducts 218 connecting opposite ends of the first duct 216 to outlets 217 of the ventilating spaces H.

The installation of the suction devices K may be varied such that, for example, one suction device K is provided for each ventilating space H or one suction device K draws air flows from three or more ventilating spaces H. The construction of suction device K is also variable, for example, to guide the air flows outwardly of a clean room by means of a duct or ducts.

Furthermore, the station primary coil C1 and the accelerating and decelerating primary coils C2 are disposed close to one another in the region of station ST, and it is possible for these primary coils C1 and C2 to fill up the ventilating space H. Therefore, as shown in phantom lines in FIGS. 24 and 25, a duct 218 is directly connected to the running space G in the region of station ST. Although not shown, this duct 213 of course also is in communication with a suction blower having a HEPA filter.

We claim:

1. A conveyor system utilizing a linear motor, comprising;
   a conveyor cart (A) including a pair of propelling wheels for supporting the same,
   a guide rail (B) for movably supporting said conveyor cart (A),
   a linear motor including,
   primary coil means (C) mounted on said guide rail (B), and
   a conductor (D) mounted on said conveyor cart (A) and horizontally opposed to said primary coil means (C),
   wherein said conveyor cart (A) includes at lateral sides thereof a plurality of rollers (8), said rollers (8) being placed in rotatable contact with a horizontal face of said guide rail (B) for following horizontal flextion of the same
   wherein said guide rail (B) is an integral structure including side walls interspersed with a constant distance therebetween for outwardly contacting said plurality of rollers (8), a rail portion (1A) for supporting said propelling wheels (7) against inner faces of said side walls and a bottom portion for supporting said primary coil (C), and
   wherein said conductor (D) includes conductor portions (D1, D2) formed continuously with each other and horizontally flexes by a pivot mechanism, said conductor (D) together with said rollers (8) horizontally flexing to follow the horizontal flextion of said guide rail (B).

2. A conveyor system as claimed in claim 1 wherein said primary coil means (C) includes a stopping primary coil (C1) for generating a propulsive force to stop said conveyor cart (A) at a target stopping position, said stopping primary coil (C1) being electrified under control by electrification control means for deceleration (100A) adapted to calculate a propulsive force each time said conveyor cart (A) advances a predetermined distance, for causing said conveyor cart (A) to advance a next predetermined distance, and to amend the propulsive force calculated, in response to a change in speed resulting from a previous generation of the propulsive force.

3. A conveyor system as claimed in claim 2 wherein said electrification control means for deceleration (100A) is adapted to calculate the propulsive force for generation each time said conveyor cart (A) advances the predetermined distance on the basis of a difference between a running speed at a current position and a target speed at a position that the conveyor cart reaches after advancing the predetermined distance from the current position, the predetermined distance, and a weight of said conveyor cart, and to derive the weight of said conveyor cart for a second and subsequent calculations of the propulsive force on the basis of speed variations resulting from the propulsive force applied the previous times.

4. A conveyor system as claimed in claim 3 wherein said primary coil means (C) further includes a negative propulsion primary coil (C2) for applying a negative propulsive force to said conveyor cart (A), said negative propulsion primary coil (C2) being disposed adjacent said stopping primary coil (C1).

5. A conveyor system as claimed in claim 4 wherein said negative propulsion primary coil (C2) is utilized also for accelerating said conveyor cart (A) started from said stopping primary coil (C1).

6. A conveyor system as claimed in claim 5 wherein said conveyor cart (A) includes a memory medium (15) for storing destination data, and wherein electrification control means for acceleration and deceleration (100B) adapted to control electrification of said negative propulsion primary coil (C2) and said electrification control means for deceleration (100A) include reading means (16) for reading the data stored in said memory medium (15).

7. A conveyor system as claimed in claim 1 wherein said primary coil means (C) includes an intermediate accelerating primary coil (C3) for accelerating said conveyor cart (A) to a target speed, said intermediate accelerating primary coil (C3) being electrified under control by electrification control means for intermediate acceleration (100C) adapted to calculate a propulsive force on the basis of a difference between said target speed and an advancing speed of said conveyor cart (A), a weight of said conveyor cart (A), and a predetermined period of time for applying the propulsive force or a predetermined distance said conveyor cart (A) advances while the propulsive force is applied, and to electrify said intermediate primary coil (C3) for said predetermined period of time.

8. A conveyor system as claimed in claim 7 wherein said primary coil means (C) further includes a stopping primary coil (C1) for generating a propulsive force to stop said conveyor cart (A) at a target stopping position, and a negative propulsion primary coil (C2) for applying a negative propulsive force to said conveyor cart (A), said negative propulsion primary coil (C2) being disposed adjacent said stopping primary coil (C1).

9. A conveyor system as claimed in claim 8 wherein said negative propulsion primary coil (C2) is utilized also for accelerating said conveyor cart (A) started from said stopping primary coil (C1).

10. A conveyor system as claimed in claim 9 wherein said conveyor cart (A) includes a memory medium (15) for storing destination data, and wherein electrification control means for acceleration and deceleration (100B) adapted to control electrification of said negative propulsion primary coil (C2) and said electrification control means for deceleration (100A) include reading means (16) for reading the data stored in said memory medium (15).

11. A conveyor system as claimed in claim 1, further including:
   a station (ST) for mounting and dismounting load to and from said conveyor cart (A) and disposed adjacent said guide rail (B),
   a retaining member (11) attached to said conveyor cart (A) and formed of a ferromagnetic material, and
   an electromagnet (10) disposed at a lower portion of the inner face of said guide rail (B) adjacent said station so as to be in opposed contact with said retaining member (11),
   wherein said electromagnet (10) magnetically pulls said retaining portion (11) thereby retaining said conveyor cart (A) at a predetermined position of said station (ST).

12. A conveyor system as claimed in claim 11, further including:
   a power line (E) for supplying power to said primary coil (C) for activating said linear motor, and
   a signal line (F) for transmitting propelling control signals for the conveyor cart (A),
   wherein said power line (E) is attached to an inner side of said guide rail (B) and said signal line (F) is attached to an outer side of guide rail (B) and is electrically insulated from said power line (E) by said guide rail (B).

13. A conveyor system as claimed in claim 12, further including:
   an article carrying deck (4) disposed at an upper portion of said conveyor cart (A), and
   a suction device (K) for sucking air from an interior of said guide rail (B), checking dust contained in the air by a filter (214) and then exhausting the cleaned air,
   wherein said guide rail (B) has a cross section with an upper opening, such that said conveyor cart (A) travels in said guide rail (B) while exposing said article carrying deck (4) through said upper opening towards an upper outer portion of said guide rail (B).

* * * * *